(12) United States Patent
Lee et al.

(10) Patent No.: US 12,060,477 B2
(45) Date of Patent: Aug. 13, 2024

(54) POLYMER COMPOSITION FOR MANUFACTURING LARGE CONTAINER CONTAINING HIGH-DENSITY POLYETHYLENE RECOVERED FROM SECONDARY BATTERY SEPARATOR AND LARGE CONTAINER MANUFACTURED USING THE SAME

(71) Applicants: SK Innovation Co., Ltd., Seoul (KR); SK Geo Centric Co., Ltd., Seoul (KR)

(72) Inventors: Hye Jin Lee, Daejeon (KR); Jong Sang Park, Daejeon (KR); Jin Seong Kim, Daejeon (KR)

(73) Assignees: SK Innovation Co., Ltd., Seoul (KR); SK Geo Centric Co., Ltd., Seoul (KR)

( * ) Notice: Subject to any disclaimer, the term of this patent is extended or adjusted under 35 U.S.C. 154(b) by 0 days.

(21) Appl. No.: 18/158,708

(22) Filed: Jan. 24, 2023

(65) Prior Publication Data

US 2023/0235155 A1    Jul. 27, 2023

(30) Foreign Application Priority Data

Jan. 25, 2022 (KR) .................. 10-2022-0010911

(51) Int. Cl.
| | | |
|---|---|---|
| C08L 23/06 | (2006.01) | |
| B65D 65/38 | (2006.01) | |
| B29C 49/06 | (2006.01) | |
| B29K 23/00 | (2006.01) | |
| B29K 105/00 | (2006.01) | |
| B29K 105/26 | (2006.01) | |
| B29L 31/00 | (2006.01) | |

(52) U.S. Cl.
CPC .............. *C08L 23/06* (2013.01); *B65D 65/38* (2013.01); *B29C 49/06* (2013.01); *B29K 2023/065* (2013.01); *B29K 2105/0094* (2013.01); *B29K 2105/26* (2013.01); *B29L 2031/712* (2013.01); *B65D 2565/384* (2013.01); *C08L 2205/025* (2013.01); *C08L 2207/20* (2013.01); *Y02W 30/84* (2015.05)

(58) Field of Classification Search
CPC ....................................... C08L 23/06
See application file for complete search history.

(56) References Cited

U.S. PATENT DOCUMENTS

| | | | | |
|---|---|---|---|---|
| 4,138,534 A | * | 2/1979 | Tedesco | ........... C08J 11/06 521/143 |
| 5,948,557 A | * | 9/1999 | Ondeck | ........... C08J 5/18 521/64 |
| 2009/0075004 A1 | * | 3/2009 | Starita | ........... B32B 1/08 428/36.9 |
| 2011/0086993 A1 | * | 4/2011 | Smith | ........... B29C 43/006 526/329 |

FOREIGN PATENT DOCUMENTS

| | | |
|---|---|---|
| CN | 112920494 A | 6/2021 |
| WO | 2022261238 A1 | 12/2022 |

OTHER PUBLICATIONS

KR102181876-translation (Year: 2020).*
KR102181876 original (Year: 2020).*
Paxon BC50-120 flyer (Year: 2021).*
Callister et al, Materials Science and Engineering, 9th Edition, 2014, p. 580-583 (Year: 2014).*

* cited by examiner

*Primary Examiner* — Irina Krylova
(74) *Attorney, Agent, or Firm* — The Webb Law Firm

(57) ABSTRACT

Provided is a polymer composition for manufacturing a large container that contains high-density polyethylene recycled from a secondary battery separator and has excellent mechanical properties. Specifically, a polymer composition having excellent processability may be prepared by recycling a secondary battery separator, and an eco-friendly large container having excellent mechanical properties such as a flexural modulus, an elongation, and an impact strength in a wide temperature range, and having an excellent environmental stress cracking resistance may be manufactured by molding the polymer composition.

13 Claims, No Drawings

POLYMER COMPOSITION FOR MANUFACTURING LARGE CONTAINER CONTAINING HIGH-DENSITY POLYETHYLENE RECOVERED FROM SECONDARY BATTERY SEPARATOR AND LARGE CONTAINER MANUFACTURED USING THE SAME

CROSS-REFERENCE TO RELATED APPLICATION

This application claims priority to Korean Patent Application No. 10-2022-0010911, filed Jan. 25, 2022, the disclosure of which is hereby incorporated by reference in its entirety.

BACKGROUND OF THE INVENTION

Field of the Invention

The following disclosure relates to a polymer composition for manufacturing a large container comprising high-density polyethylene recycled from a secondary battery separator and a large container manufactured using the same.

Description of Related Art

As the use of secondary batteries has been popularized, the number of secondary batteries that are discarded at the end of their life has also increased. Accordingly, various methods for recycling waste secondary batteries have been studied. For example, waste secondary batteries are collected and subjected to a pre-treatment operation including discharging, shredding, and sorting processes, such that external cans, separators, anodes/cathodes, and the like may be classified, and then metals such as cobalt, nickel, lithium, and manganese may be recovered.

However, a waste separator recycled from the waste secondary battery, a waste separator obtained from a defective secondary battery, or separator scrap generated in a manufacturing process is not recycled and is treated by inappropriate methods such as incineration or shredding and then taking it abroad, which is pointed out as a waste of resources and a cause of environmental pollution. As plastic decomposes by exposure to sunlight and heat, the plastic waste releases greenhouse gases such as methane and ethylene. Incineration of plastic waste releases significant amounts of greenhouse gases (GHG), such as carbon dioxide, nitrous oxide and/or methane, into the environment. Carbon dioxide is the primary greenhouse gas contributing to climate change.

Accordingly, various efforts have been made to recycle the waste separators in order to solve the above problems, but since the physical properties and processability of the waste separator itself are insufficient, it is required to adjust the physical properties and processability of the waste separator to be suitable for the purpose and molding method.

In general, since a separator is formed of polyethylene, various products may be molded using the polyethylene recycled from the waste separator. Specifically, small products such as daily necessities may be manufactured or large products such as a water tank, playground equipment, and a vehicle frame may be manufactured. In particular, the large products are used in an external environment and are subjected to a high load for a long period of time, and thus should have excellent mechanical properties such as an environmental stress cracking resistance (ESCR) and an impact strength, a tensile strength, and a flexural modulus in a wide temperature range and should have excellent processability for efficient workability. However, the polyethylene recycled from the waste separator has an excellent impact strength in a wide temperature range, but has a poor environmental stress cracking resistance, an insufficient flexural modulus, and poor processability, and as a result, it is difficult to be molded.

Therefore, there is a need for developing an eco-friendly polymer composition that contains polyethylene recycled from a waste separator, may be efficiently molded because it has excellent processability, and may implement excellent mechanical properties in a wide temperature range and an excellent environmental stress cracking resistance. Also, it is desirable to recycle plastic waste separators to reduce incineration and waste disposal of plastic to mitigate or reduce greenhouse gas emissions which can contribute to climate change.

SUMMARY OF THE INVENTION

An embodiment of the present disclosure is directed to providing an eco-friendly polymer composition for manufacturing a large container that comprises high-density polyethylene recycled from a secondary battery separator, has excellent mechanical properties such as a flexural modulus and an impact strength in a wide temperature range, and has an excellent environmental stress cracking resistance.

Another embodiment of the present disclosure is directed to providing a large container manufactured by molding the polymer composition for manufacturing a large container.

Still another embodiment of the present disclosure is directed to providing a method of preparing a polymer composition having excellent processability and manufacturing a large container having excellent mechanical properties by molding the polymer composition by recycling a waste secondary battery separator.

In one general aspect, a polymer composition for manufacturing a large container comprises: a first high-density polyethylene recycled from a secondary battery separator; and a second high-density polyethylene having a density of 0.930 to 0.970 g/cm$^3$ and a melt flow index of 5 to 30 g/10 min when measured according to ASTM D1238 (190° C., 21.6 kg).

In the polymer composition for manufacturing a large container according to an exemplary embodiment, the secondary battery separator may be one or two or more waste separators selected from a waste separator obtained by removing an inorganic coating layer from a separator recycled from a waste lithium secondary battery or a defective secondary battery, scrap generated in a secondary battery separator manufacturing process, and a separator distal end recycled after being trimmed.

In the polymer composition for manufacturing a large container according to an exemplary embodiment, the first high-density polyethylene recycled from the secondary battery separator may have a melt flow index of 0.1 to 3.0 g/10 min when measured according to ASTM D1238 (190° C., 21.6 kg).

In the polymer composition for manufacturing a large container according to an exemplary embodiment, the first high-density polyethylene recycled from the secondary battery separator may have a flexural modulus of 5,000 to 8,000 kg/cm$^2$, a yield strength of 200 to 400 kg/cm$^2$, a tensile strength of 300 to 500 kg/cm$^2$, and an elongation of 150% or more.

In the polymer composition for manufacturing a large container according to an exemplary embodiment, the polymer composition for manufacturing a large container may comprise 20 to 60 wt % of the first high-density polyethylene recycled from the secondary battery separator and 40 to 80 wt % of the second high-density polyethylene.

In the polymer composition for manufacturing a large container according to an exemplary embodiment, the melt flow index $MFI_1$ of the first high-density polyethylene and the melt flow index $MFI_2$ of the second high-density polyethylene may satisfy the following Expression 2, and the melt flow index may be measured according to ASTM D1238 (190° C., 21.6 kg), $$7 \leq MFI_2 - MFI_1 \leq 13. \qquad \text{[Expression 2]}$$

In the polymer composition for manufacturing a large container according to an exemplary embodiment, the second high-density polyethylene may have a melt flow index of 5 to 15 g/10 min when measured according to ASTM D1238 (190° C., 21.6 kg).

In the polymer composition for manufacturing a large container according to an exemplary embodiment, the second high-density polyethylene may have a room-temperature Izod impact strength of 50 kgf·cm/cm or less when measured at 25° C.

In the polymer composition for manufacturing a large container according to an exemplary embodiment, the second high-density polyethylene may have a flexural modulus of 9,000 kg/cm² or more.

In the polymer composition for manufacturing a large container according to an exemplary embodiment, the polymer composition for manufacturing a large container may have a melt flow index of 3 to 9 g/10 min when measured according to ASTM D1238 (190° C., 21.6 kg).

In the polymer composition for manufacturing a large container according to an exemplary embodiment, the polymer composition for manufacturing a large container may have a yield strength of 240 kg/cm² or more, a tensile strength of 250 kg/cm² or more, and an elongation of 1,000% or more.

In the polymer composition for manufacturing a large container according to an exemplary embodiment, the polymer composition for manufacturing a large container may satisfy the following conditions (1) and (2):

$$1 < IZ_{25}/IZ_{-20} < 3 \qquad (1)$$

$$ESCR > 800 \text{ hours} \qquad (2)$$

in the conditions (1) and (2), $IZ_a$ is an Izod impact strength (kgf·cm/cm) measured at a temperature of a ±1° C., a is a real number, and ESCR is an environmental stress cracking resistance (time) measured according to ASTM D1693.

In the polymer composition for manufacturing a large container according to an exemplary embodiment, the polymer composition for manufacturing a large container may have $IZ_{25}$ and $IZ_{-20}$ independently of each other of 20 kgf·cm/cm or more and a flexural modulus of 10,000 kg/cm² or more, where $IZ_a$ is an Izod impact strength (kgf·cm/cm) measured at a temperature of a ±1° C., and a is a real number.

In the polymer composition for manufacturing a large container according to an exemplary embodiment, the polymer composition for manufacturing a large container may comprise x wt % of the first high-density polyethylene and y wt % of the second high-density polyethylene and may satisfy the following Expression 3:

$$E_3 > (x^*E_1 + y^*E_2)/100 \qquad \text{[Expression 3]}$$

in Expression 3, $E_1$ is an elongation of the first high-density polyethylene, $E_2$ is an elongation of the second high-density polyethylene, $E_3$ is an elongation of the polymer composition for manufacturing a large container, and each of x and y is a real number equal to or greater than 1.

In the polymer composition for manufacturing a large container according to an exemplary embodiment, the polymer composition for manufacturing a large container may comprise x wt % of the first high-density polyethylene and y wt % of the second high-density polyethylene and may satisfy the following Expression 5:

$$FM_3 > (x^*FM_1 + y^*FM_2)/100 \qquad \text{[Expression 5]}$$

in Expression 5, $FM_1$ is a flexural modulus of the first high-density polyethylene, $FM_2$ is a flexural modulus of the second high-density polyethylene, $FM_3$ is a flexural modulus of the polymer composition for manufacturing a large container, and each of x and y is a real number equal to or greater than 1.

In another general aspect, there is provided a large container manufactured by molding the polymer composition for manufacturing a large container.

In still another general aspect, a method of manufacturing a large container by recycling a waste secondary battery separator comprises:

(a) recycling first high-density polyethylene from a secondary battery separator and selecting second high-density polyethylene satisfying the following Expression 1;

(b) producing a preform using a polymer composition for manufacturing a large container comprising the first high-density polyethylene and the second high-density polyethylene; and (c) manufacturing a large container by molding the preform, wherein the second high-density polyethylene has a density of 0.930 to 0.970 g/cm³ and a melt flow index of 5 to 30 g/10 min when measured according to ASTM D1238 (190° C., 21.6 kg), $$5 \leq MFI_2 - MFI_1 \leq 15 \qquad \text{[Expression 1]}$$

in Expression 1, $MFI_1$ is a melt flow index of the first high-density polyethylene, $MFI_2$ is a melt flow index of the second high-density polyethylene, and the melt flow index is measured according to ASTM D1238 (190° C., 21.6 kg).

In the method of manufacturing a large container by recycling a waste secondary battery separator according to an exemplary embodiment, the secondary battery separator in step (a) may be one or two or more waste separators selected from a waste separator obtained by removing an inorganic coating layer from a separator recycled from a waste lithium secondary battery or a defective secondary battery, scrap generated in a secondary battery separator manufacturing process, and a separator distal end recycled after being trimmed.

In the method of manufacturing a large container by recycling a waste secondary battery separator according to an exemplary embodiment, the molding in step (c) may be performed by injection molding, blow molding, extrusion molding, or rotational molding.

In another general aspect, there is provided a method for reducing greenhouse gas emissions from a waste secondary battery separator, comprising: obtaining a first high-density polyethylene from a waste secondary battery separator as a recycled feedstock material for manufacturing a large container; combining the first high-density polyethylene with a second high-density polyethylene to form a mixture; and molding the mixture to form a large container.

Other features and aspects will be apparent from the following detailed description, and the claims.

DESCRIPTION OF THE INVENTION

Hereinafter, the present disclosure will be described in more detail. However, each of the following specific exemplary embodiments or exemplary embodiments is merely one reference example for describing the present disclosure in detail, and the present disclosure is not limited thereto and may be implemented in various forms.

In addition, unless otherwise defined, all the technical terms and scientific terms have the same meanings as commonly understood by those skilled in the art to which the present disclosure pertains.

The terms used for description in the present specification are merely used to effectively describe a specific exemplary embodiment, but are not intended to limit the present disclosure.

In addition, unless the context clearly indicates otherwise, singular forms used in the specification and the scope of the appended claims are intended to include plural forms.

In addition, units used in the present specification without special mention are based on weight, and as an example, a unit of % or a ratio means wt % or a weight ratio. Unless otherwise defined, wt % means wt % of any one component in a composition with respect to the total weight of the composition.

In addition, unless explicitly described to the contrary, "comprising" any components will be understood to imply further inclusion of other components rather than the exclusion of any other components.

In addition, the term "large container" used in the present specification may include a large industrial/building structure having a capacity of 50 L or more, such as a large drum, fuel tank, water tank, transport pallet, or a floating structure for floating photovoltaic power generation, and may include a large structure having a volume of 1 m$^3$ or more, but is not limited thereto.

For the purposes of this specification, unless otherwise indicated, all numbers expressing quantities of ingredients, reaction conditions, dimensions, physical characteristics, and so forth used in the specification and claims are to be understood as being modified in all instances by the term "about." Unless indicated to the contrary, the numerical parameters set forth in the following specification and attached claims are approximations that can vary depending upon the desired properties sought to be obtained by the present invention.

In addition, a numerical range used in the present specification may include upper and lower limits and all values within these limits, increments logically derived from a form and span of a defined range, all double limited values, and all possible combinations of the upper and lower limits in the numerical range defined in different forms. For example, a range of "1 to 10" is intended to include any and all sub-ranges between and including the recited minimum value of 1 and the recited maximum value of 10, that is, all subranges beginning with a minimum value equal to or greater than 1 and ending with a maximum value equal to or less than 10, and all subranges in between, e.g., 1 to 6.3, or 5.5 to 10, or 2.7 to 6.1. Unless otherwise specifically defined in the specification of the present disclosure, values out of the numerical ranges that may occur due to experimental errors or rounded values also fall within the defined numerical ranges.

Hereinafter, the present disclosure will be described in more detail.

The present disclosure provides a polymer composition for manufacturing a large container comprising a first high-density polyethylene recycled from a secondary battery separator; and a second high-density polyethylene having a density of 0.930 to 0.970 g/cm$^3$ and a melt flow index of 5 to 30 g/10 min when measured according to ASTM D1238 (190° C., 21.6 kg).

In the polymer composition for manufacturing a large container according to an exemplary embodiment, the secondary battery separator may be one or two or more waste separators selected from a separator recycled from a waste lithium secondary battery, a separator recycled from a defective secondary battery, separator scrap generated in a secondary battery separator manufacturing process, and a separator distal end recycled after being trimmed. The first high-density polyethylene recycled from the secondary battery separator (hereinafter, referred to as first high-density polyethylene) is difficult to recycle because it has insufficient processability or insufficient mechanical properties such as a flexural modulus and an environmental stress cracking resistance. However, the polymer composition for manufacturing a large container according to an exemplary embodiment may effectively implement excellent processability and mechanical strength despite containing the first high-density polyethylene.

In the polymer composition for manufacturing a large container according to an exemplary embodiment, the first high-density polyethylene may have a weight average molecular weight (Mw) of 50,000 to 2,000,000 g/mol, or 80,000 to 1,500,000 g/mol, or 100,000 to 1,000,000 g/mol, a number average molecular weight (Mn) of 30,000 to 1,000,000 g/mol, or 40,000 to 500,000 g/mol, or 50,000 to 300,000 g/mol, and a polydispersity index (PDI) of 1 to 50, or 1.5 to 20, or 3 to 10, but the first high-density polyethylene is not limited thereto, as long as it is first high-density polyethylene recycled from the secondary battery separator described above.

In the polymer composition for manufacturing a large container according to an exemplary embodiment, the first high-density polyethylene may have a melt flow index of 0.1 to 5.0 g/10 min, or 0.1 to 3.0 g/10 min, or 0.5 to 1.5 g/10 min, when measured according to ASTM D1238 (190° C., 21.6 kg). The polymer composition according to an exemplary embodiment may implement a melt flow index suitable for manufacturing a large container despite comprising the first high-density polyethylene having a melt flow index within the above range.

In the polymer composition for manufacturing a large container according to an exemplary embodiment, a density of the first high-density polyethylene may be 0.920 to 0.990 g/cm$^3$, or 0.930 to 0.970 g/cm$^3$, or 0.940 to 0.960 g/cm$^3$.

In the polymer composition for manufacturing a large container according to an exemplary embodiment, a melting point (Tm) of the first high-density polyethylene may be 100° C. or higher, or 120° C. or higher, or 130 to 200° C., but is not limited thereto.

In the polymer composition for manufacturing a large container according to an exemplary embodiment, a yield strength of the first high-density polyethylene may be 150 to 550 kg/cm$^2$, or 200 to 400 kg/cm$^2$, or 220 to 350 kg/cm$^2$, but is not limited thereto.

In the polymer composition for manufacturing a large container according to an exemplary embodiment, a tensile strength of the first high-density polyethylene may be 150 to 850 kg/cm², or 200 to 700 kg/cm², or 300 to 500 kg/cm², but is not limited thereto.

In the polymer composition for manufacturing a large container according to an exemplary embodiment, an elongation at break of the first high-density polyethylene may be 150% or more, or 300 to 3,000%, or 500 to 2,000%, or 700 to 1,100%, but is not limited thereto.

In the polymer composition for manufacturing a large container according to an exemplary embodiment, a room-temperature Izod impact strength ($IZ_{25}$) of the first high-density polyethylene may be kgf·cm/cm or more, or 80 kgf·cm/cm or more. In addition, a low-temperature Izod impact strength ($IZ_{-20}$) may be 50 kgf·cm/cm or more, or 80 kgf·cm/cm or more, and upper limits of the room-temperature Izod impact strength ($IZ_{25}$) and the low-temperature Izod impact strength ($IZ_{-20}$) are not particularly limited, but may be each independently 1,000 kg·cm/cm or less, where $IZ_a$ is an Izod impact strength (kg·cm/cm) measured at a temperature of a ±1° C., and a is a real number of −50 to 100. In the case of the polymer composition for manufacturing a large container comprising the first high-density polyethylene satisfying the above ranges, an excellent Izod impact strength may be exhibited, and in particular, a low-temperature Izod impact strength measured at sub-zero temperatures may be more significantly improved.

In the polymer composition for manufacturing a large container according to an exemplary embodiment, a flexural modulus of the first high-density polyethylene may be 2,000 to 20,000 kg/cm², or 3,000 to 15,000 kg/cm², or 5,000 to 10,000 kg/cm².

In the polymer composition for manufacturing a large container according to an exemplary embodiment, an environmental stress cracking resistance (ESCR) of the first high-density polyethylene may be 200 hours or shorter, or 100 hours or shorter, or 5 to 80 hours. High-density polyethylene recycled from a common secondary battery separator is not suitable for manufacturing a large container due to an insufficient environmental stress cracking resistance. However, the polymer composition according to an exemplary embodiment comprises the first high-density polyethylene and the second high-density polyethylene satisfying the physical properties described above in the above content ranges, such that a large container having an excellent environmental stress cracking resistance may be manufactured.

In the polymer composition for manufacturing a large container according to an exemplary embodiment, the second high-density polyethylene may have a weight average molecular weight (Mw) of 50,000 to 2,000,000 g/mol, or 80,000 to 1,500,000 g/mol, or 100,000 to 1,000,000 g/mol, a number average molecular weight (Mn) of 10,000 to 1,000,000 g/mol, or 30,000 to 1,000,000 g/mol, or 50,000 to 1,000,000 g/mol, and a polydispersity index (PDI) of 1 to 100, or 5 to 50, but the second high-density polyethylene is not limited thereto, and a commercially available product may be used.

In the polymer composition for manufacturing a large container according to an exemplary embodiment, the melt flow index $MFI_1$ of the first high-density polyethylene and the melt flow index $MFI_2$ of the second high-density polyethylene may satisfy the following Expression 1, and the following Expression 2. Here, the melt flow index is measured according to ASTM D1238 (190° C., 21.6 kg).

$$5 \leq MFI_2 - MFI_1 - 15 \qquad \text{[Expression 1]}$$

$$7 \leq MFI_2 - MFI_1 - 13 \qquad \text{[Expression 2]}$$

The polymer composition comprising the first high-density polyethylene and the second high-density polyethylene satisfying Expression 1, and specifically, Expression 2, may exhibit a melt flow index suitable for manufacturing a large container, thereby implementing improved work efficiency and a low defect rate.

In addition, the second high-density polyethylene is not particularly limited as long as the melt flow index measured according to ASTM D1238 (190° C., 21.6 kg) satisfies Expression 1, and the melt flow index of the second high-density polyethylene may be 1 to 50.0 g/10 min, or 3 to 30.0 g/10 min, or 5 to 15 g/10 min, or 5 to 10 g/10 min.

In the polymer composition for manufacturing a large container according to an exemplary embodiment, a density of the second high-density polyethylene may be 0.930 to 0.970 g/cm³, or 0.940 to 0.970 g/cm³, or 0.950 to 0.965 g/cm³.

In the polymer composition for manufacturing a large container according to an exemplary embodiment, a melting point (Tm) of the second high-density polyethylene may be 100° C. or higher, or 120° C. or higher, or 130 to 200° C., but is not limited thereto.

In the polymer composition for manufacturing a large container according to an exemplary embodiment, a yield strength of the second high-density polyethylene may be 150 to 550 kg/cm², or 200 to 400 kg/cm², or 220 to 350 kg/cm², but is not limited thereto.

In the polymer composition for manufacturing a large container according to an exemplary embodiment, a tensile strength of the second high-density polyethylene may be 100 to 500 kg/cm², or 150 to 400 kg/cm², or 180 to 350 kg/cm², but is not limited thereto.

In the polymer composition for manufacturing a large container according to an exemplary embodiment, an elongation at break of the second high-density polyethylene may be 300 to 3,000%, or 700 to 2,000%, or 800 to 1,500%, but is not limited thereto.

In the polymer composition for manufacturing a large container according to an exemplary embodiment, a room-temperature Izod impact strength ($IZ_{25}$) of the second high-density polyethylene may be 1 kgf·cm/cm or more, or 5 to 50 kgf·cm/cm. In addition, a low-temperature Izod impact strength ($IZ_{-20}$) of the second high-density polyethylene may be 1 kgf·cm/cm or more, or 3 to 50 kgf·cm/cm, where $IZ_a$ is an Izod impact strength (kgf·cm/cm) measured at a temperature of a ±1° C., and a is a real number of −50 to 100. The second high-density polyethylene satisfying the above ranges exhibits a relatively insufficient Izod impact strength. However, the second high-density polyethylene is contained in the polymer composition for manufacturing a large container together with the first high-density polyethylene, such that an excellent Izod impact strength may be exhibited, and in particular, a low-temperature Izod impact strength measured at sub-zero temperatures may be more significantly improved.

In the polymer composition for manufacturing a large container according to an exemplary embodiment, a flexural modulus of the second high-density polyethylene may be 5,000 to 50,000 kg/cm², or 7,000 to 30,000 kg/cm², or 9,000 to 15,000 kg/cm² or 9,000 kg/cm² or more.

In the polymer composition for manufacturing a large container according to an exemplary embodiment, an environmental stress cracking resistance (ESCR) of the second high-density polyethylene may be 100 hours or longer, or 800 hours or longer, or 1,000 hours or longer, but an upper limit thereof is not particularly limited.

In the polymer composition for manufacturing a large container according to an exemplary embodiment, in the case of the polymer composition for manufacturing a large container comprising the second high-density polyethylene satisfying the physical properties described above, excellent process stability may be implemented because generation of fine powder or fumes is suppressed, and a melt flow index suitable for manufacturing a large container is exhibited despite containing a significant amount of the first high-density polyethylene recycled from the waste separator, such that work efficiency may be further improved, and an eco-friendly large container having excellent mechanical properties such as an elongation and a flexural modulus may be manufactured.

In the polymer composition for manufacturing a large container according to an exemplary embodiment, the polymer composition for manufacturing a large container may comprise 20 to 60 wt % of the first high-density polyethylene and 40 to 80 wt % of the second high-density polyethylene, or may comprise 30 to 50 wt % of the first high-density polyethylene and 50 to 70 wt % of the second high-density polyethylene. When the above ranges are satisfied, work efficiency may be excellent because a melt flow index suitable for manufacturing a large container is exhibited, and generation of fine powder or fumes is reduced, such that excellent process stability may be implemented, and a large container having more excellent mechanical properties such as an Izod impact strength, an elongation, and a flexural modulus may be manufactured. Furthermore, as the content of the first high-density polyethylene is increased, recycling efficiency is increased, such that eco-friendliness may be more effectively implemented.

The polymer composition for manufacturing a large container according to an exemplary embodiment exhibits a melt flow index suitable for manufacturing a large container despite comprising 30 wt % or more of the first high-density polyethylene recycled from the secondary battery separator, such that excellent work efficiency may be exhibited, and a large container having excellent mechanical properties such as an Izod impact strength, an elongation, and a flexural modulus may be manufactured, and eco-friendliness may be more effectively implemented because the polymer composition for manufacturing a large container according to an exemplary embodiment comprises 30 wt % or more of the recycled high-density polyethylene.

In the polymer composition for manufacturing a large container according to an exemplary embodiment, a density of the polymer composition for manufacturing a large container may be 0.930 to 0.990 g/cm³, or 0.940 to 0.980 g/cm³, or 0.945 to 0.975 g/cm³. The polymer composition for manufacturing a large container may be used for manufacturing a floating structure (buoyant body) because it has a lower density than water.

In the polymer composition for manufacturing a large container according to an exemplary embodiment, the polymer composition for manufacturing a large container may have a melt flow index of 1 to 20 g/10 min, or 3 to 15 g/10 min, or 3 to 9 g/10 min, when measured according to ASTM D1238 (190° C., 21.6 kg). When the above range is satisfied, appropriate processability is imparted to a large container manufacturing process, such that further improved work efficiency and a lower defect rate may be implemented.

In the polymer composition for manufacturing a large container according to an exemplary embodiment, a yield strength and a tensile strength of the polymer composition for manufacturing a large container may be each independently 180 kg/cm² or more, or 220 kg/cm² or more, or 240 kg/cm² or more, or 250 kg/cm² or more, and an upper limit thereof is not particularly limited, but may be 1,000 kg/cm² or less, and an elongation at break of the polymer composition for manufacturing a large container may be 700% or more, or 800% or more, or 1,000% or more, and an upper limit thereof is not particularly limited, but may be 3,000% or less.

In the polymer composition for manufacturing a large container according to an exemplary embodiment, the yield strength and the tensile strength of the polymer composition for manufacturing a large container may be each independently 180 to 1,000 kg/cm², or 220 to 800 kg/cm², or 240 to 600 kg/cm², or 250 to 500 kg/cm², and the elongation at break of the polymer composition for manufacturing a large container may be 700 to 3,000%, or 800 to 3,000%, or 1,000 to 2,000%.

In the polymer composition for manufacturing a large container comprising x wt % of the first high-density polyethylene and y wt % of the second high-density polyethylene, a relationship between the elongation $E_1$ of the first high-density polyethylene, the elongation $E_2$ of the second high-density polyethylene, and the elongation $E_3$ of the polymer composition for manufacturing a large container may satisfy the following Expression 3, and specifically, the following Expression 4:

$$E_3 > (x^*E_1 + y^*E_2)/100 \qquad \text{[Expression 3]}$$

$$E_3 > 1.1^*(x^*E_1 + y^*E_2)/100. \qquad \text{[Expression 4]}$$

The polymer composition for manufacturing a large container according to an exemplary embodiment comprises a combination of the first high-density polyethylene and the second high-density polyethylene, such that Expression 3, and specifically, Expression 4, may be satisfied, thereby exhibiting a better elongation than expected.

In the polymer composition for manufacturing a large container according to an exemplary embodiment, the polymer composition for manufacturing a large container may have $IZ_{25}$ and $IZ_{-20}$ independently of each other of 10 kgf·cm/cm or more or 10 to 200 kgf·cm/cm. Specifically, $IZ_{25}$ may be 20 to 150 kgf·cm/cm or more, or 25 to 80 kgf·cm/cm, and $IZ_{-20}$ may be 20 to 200 kgf·cm/cm or more, or 20 to 50 kgf·cm/cm. In addition, $IZ_{25}$ and $IZ\_20$ may simultaneously satisfy the above ranges, but are not limited thereto, where $IZ_a$ is an Izod impact strength (kgf·cm/cm) measured at a temperature of a ±1° C., and a is a real number of −50 to 100.

In the polymer composition for manufacturing a large container according to an exemplary embodiment, an environmental stress cracking resistance (ESCR) of the polymer composition for manufacturing a large container may be 100 hours or longer, or 800 hours or longer, or 1,000 hours or longer, and an upper limit thereof is not particularly limited. The polymer composition according to an exemplary embodiment may implement an excellent environmental stress cracking resistance (ESCR) despite comprising the high-density polyethylene recycled from the secondary battery separator that has an insufficient environmental stress cracking resistance (ESCR).

In the polymer composition for manufacturing a large container according to an exemplary embodiment, the polymer composition for manufacturing a large container may satisfy the following conditions (1) and (2), and specifically, the following conditions (2) and (3):

$$1 < IZ_{25}/IZ_{-20} < 3 \qquad (1)$$

$$ESCR > 800 \text{ hours} \qquad (2)$$

$$1 < IZ_{25}/IZ_{-20} < 2 \qquad (3)$$

in the conditions (1) to (3), $IZ_a$ is an Izod impact strength (kgf·cm/cm) measured at a temperature of a ±1° C., a is a real number, and ESCR is an environmental stress cracking resistance (time) measured according to ASTM D1693.

In the polymer composition for manufacturing a large container according to an exemplary embodiment, a flexural modulus of the polymer composition for manufacturing a large container may be 7,500 kg/cm² or more, or 9,000 kg/cm² or more, or 10,000 kg/cm² or more, and an upper limited thereof is not particularly limited, but may be 100,000 kg/cm² or less.

In the polymer composition for manufacturing a large container according to an exemplary embodiment, the flexural modulus of the polymer composition for manufacturing a large container may be 7,500 to 100,000 kg/cm², or 9,000 to 80,000 kg/cm², or 10,000 to 50,000 kg/cm².

In the polymer composition for manufacturing a large container comprising x wt % of the first high-density polyethylene and y wt % of the second high-density polyethylene, a relationship between the flexural modulus $FM_1$ of the first high-density polyethylene, the flexural modulus $FM_2$ of the second high-density polyethylene, and the flexural modulus $FM_3$ of the polymer composition for manufacturing a large container may satisfy the following Expression 5, and specifically, the following Expression 6:

$$FM_3 > (x*FM_1 + y*FM_2)/100 \qquad \text{[Expression 5]}$$

$$FM_3 > 1.1*(x*FM_1 + y*FM_2)/100. \qquad \text{[Expression 6]}$$

The polymer composition for manufacturing a large container according to an exemplary embodiment comprises a combination of the first high-density polyethylene and the second high-density polyethylene, such that Expression 5, and specifically, Expression 6, may be satisfied, thereby exhibiting a better flexural modulus than expected.

In addition, in the polymer composition for manufacturing a large container comprising x wt % of the first high-density polyethylene and y wt % of the second high-density polyethylene, Expressions 3 and 5 may be simultaneously satisfied, and specifically, Expressions 4 and 6 may be simultaneously satisfied.

In addition, a relationship between the flexural modulus $FM_1$ of the first high-density polyethylene and the flexural modulus $FM_3$ of the polymer composition for manufacturing a large container may satisfy the following Expression 7:

$$1.0 \leq FM_3/FM_1 \leq 2.0. \qquad \text{[Expression 7]}$$

When Expression 7 is satisfied, it is possible to prepare a polymer composition for manufacturing a large container that has a further improved flexural modulus despite being manufactured using the first high-density polyethylene recycled from the secondary battery separator.

In the polymer composition for manufacturing a large container according to an exemplary embodiment, the polymer composition may further comprise additives generally used in the art depending on the purpose and use. For example, the polymer composition may further comprise an antioxidant, a UV absorber, a UV stabilizer, a lubricant, a pigment, a colorant, a filler, a plasticizer, a rheological agent, an antistatic agent, a flame retardant, a slip agent, an anti-block agent, and the like, and the additives may be contained in an appropriate amount within a range that does not impair the desired physical properties.

The UV absorber may be a benzotriazine-based or benzotriazole-based UV absorber, and may be further mixed with primary and secondary antioxidants such as dibutylhydroxytoluene, nonylphenyl phosphite, and dibutylmethylphenol, or HALS-based UV absorbers. The type and content thereof are not particularly limited as long as the desired physical properties are not impaired.

Non-limiting examples of the benzotriazole-based UV absorber include 2-(2'-hydromethylphenyl)benzotriazole, 2-(2'-hydroxy-3',5'-bis(α,α-dimethylbenzylphenyl))benzotriazole, 2-(2'-hydroxy-3',5'-dibutylphenyl)benzotriazole, 2-(2'-hydroxy-3'-tert-butyl-5'-methylphenyl)-5-chlorobenzotriazole, and 2-(2'-hydroxy-3',5'-di-tert-butylphenyl)-5-chlorobenzotriazole, and examples of the benzotriazine-based UV absorber include bis-ethylhexyloxyphenol methoxyphenyl triazine, but are not limited thereto.

In addition, the lubricant serves to improve fluidity and suppress frictional heat during extrusion molding, and may be one or more combinations selected from hydrocarbon-based, carboxylic acid-based, alcohol-based, amide-based, and ester-based compounds, and mixtures thereof. The type and content thereof are not particularly limited as long as the desired physical properties are not impaired.

The present disclosure may provide pellets for molding comprising the polymer composition for manufacturing a large container. The pellet refers to a preform cut to a uniform size before manufacturing a molded article, and may be manufactured according to a common and known method such as extrusion and injection. In addition, the size and shape of the pellet are not limited, and the pellet may further comprise commonly used or known additives.

The present disclosure may provide a large container manufactured by molding the polymer composition for manufacturing a large container. The molding may be a molding method commonly used to manufacture a large container or a known molding method, and for example, one or more selected from injection molding, blow molding, extrusion molding, and rotational molding may be used, but are not limited thereto. The polymer composition for manufacturing a large container according to an exemplary embodiment exhibits a melt flow index suitable for a large container molding method, such that efficient work may be implemented, and accordingly, a defect rate during work may be reduced.

In addition, the large container may be a molded article such as an interior/exterior material for a vehicle, a building material, a large-capacity drum, a transport pallet, a floating structure, or a large tank, but is not limited thereto. The large container according to an exemplary embodiment has excellent physical properties such as a tensile strength, a yield strength, an elongation, a flexural strength, a low-temperature impact strength, and ESCR, such that the large container is suitable for application to a large interior/exterior structure, and above all, has excellent eco-friendliness in terms of being manufactured by recycling the first high-density polyethylene recycled from the secondary battery separator.

Hereinafter, a method of manufacturing a large container by recycling a waste secondary battery separator according to an exemplary embodiment will be described in more detail.

The present disclosure provides a method of manufacturing a large container by recycling a waste secondary battery separator, the method comprising: (a) recycling first high-density polyethylene from a secondary battery separator and selecting second high-density polyethylene satisfying the following Expression 1, and specifically, the following Expression 2; (b) producing a preform using a polymer composition for manufacturing a large container comprising the first high-density polyethylene and the second high-density polyethylene; and (c) manufacturing a large container by molding the preform, wherein the second high-density polyethylene has a density of 0.930 to 0.970 g/cm³ and a melt flow index of 5 to 30 g/10 min when measured according to ASTM D1238 (190° C., 21.6 kg), $$5 \leq MFI_2 - MFI_1 \leq 15 \quad \text{[Expression 1]}$$

$$7 \leq MFI_2 - MFI_1 \leq 13 \quad \text{[Expression 2]}$$

in Expressions 1 and 2, $MFI_1$ is a melt flow index of the first high-density polyethylene, $MFI_2$ is a melt flow index of the second high-density polyethylene, and the melt flow index is measured according to ASTM D1238 (190° C., 21.6 kg).

In the method of manufacturing a large container by recycling a waste secondary battery separator according to an exemplary embodiment, the secondary battery separator in step (a) may be one or two or more waste separators selected from a waste separator obtained by removing an inorganic coating layer from a separator recycled from a waste lithium secondary battery or a defective secondary battery, scrap generated in a secondary battery separator manufacturing process, and a separator distal end recycled after being trimmed. In addition, step (a) may further include a chemical or physical pretreatment process according to a commonly used or known method in order to remove impurities other than the first high-density polyethylene from the secondary battery separator, but is not limited thereto.

The first high-density polyethylene recycled from the secondary battery separator and the second high-density polyethylene may be combined by mixing together, optionally with one or more of the additives described herein and further processed by molding or by forming a preform as described below prior to molding. Non-limiting examples of suitable polymer processing methods comprise solvent mixing, melt kneading, or melt kneading after introducing pellets into an extruder.

In addition, specific descriptions of the first high-density polyethylene, the second high-density polyethylene, and the polymer composition for manufacturing a large container and examples of the compound are the same as those described above, and thus will be omitted.

In step (a), selecting second high-density polyethylene satisfying Expression 1, and specifically, Expression 2, may be performed, and the selected second high-density polyethylene is contained, such that a polymer composition for manufacturing a large container having the physical properties described above may be prepared.

The large container or the polymer composition for manufacturing a large container according to an exemplary embodiment is environmentally friendly in terms of recycling the waste secondary battery separator described above, and furthermore, in the case of the first high-density polyethylene recycled from the secondary battery separator, a molding method is difficult and insufficient physical properties are exhibited, but in order to overcome these problems, the second high-density polyethylene selected based on specific conditions is contained, such that a large container having further improved processability and more excellent mechanical properties may be manufactured.

A method for reducing greenhouse gas emissions from a waste secondary battery separator is provided, comprising: obtaining a first high-density polyethylene from a waste secondary battery separator as a recycled feedstock material for manufacturing a large container; combining the first high-density polyethylene with a second high-density polyethylene to form a mixture; and molding the mixture to form a large container. By using the first high-density polyethylene from a waste secondary battery separator as a recycled feedstock material, this waste material is recycled and it is not treated by inappropriate methods such as incineration or shredding, which can release greenhouse gases such as carbon dioxide, nitrous oxide and/or methane into the environment when the plastic decomposes by exposure to sunlight and heat or by incineration. By avoiding the release of greenhouse gases, recycling of this material can reduce greenhouse gas emissions and help to mitigate climate change.

In the method of manufacturing a large container by recycling a waste secondary battery separator according to an exemplary embodiment, step (b) is producing a preform for the molding in step (c) using the polymer composition for manufacturing a large container. Specifically, the preform may be produced in the form of pellets for extrusion molding or injection molding or a parison for blow molding, but is not particularly limited as long as it is common or known.

In the method of manufacturing a large container by recycling a waste secondary battery separator according to an exemplary embodiment, the molding in step (c) may be performed by injection molding, blow molding, extrusion molding, or rotational molding. The molding may be performed using any common or known method used to manufacture a large container without limitation. Although the polymer composition for manufacturing a large container according to an exemplary embodiment comprises the high-density polyethylene recycled from the secondary battery separator having insufficient physical properties and processability, the polymer composition also comprises the second high-density polyethylene selected according to specific conditions, such that processability suitable for manufacturing a large container and excellent physical properties may be exhibited.

Hereinafter, the present disclosure will be described in more detail with reference to Examples and Comparative Examples. However, the following Examples and Comparative Examples are only examples for describing the present disclosure in more detail, and the present disclosure is not limited by Examples and Comparative Examples.

Physical properties in the following Examples and Comparative Examples were measured by the following methods.

[Method for Evaluating Physical Properties]

1. Density [g/cm³]: A specimen was left at 120° C. for 1 hour, and then the specimen was cooled to 30° C. at a rate of 1.5° C./min for 1 hour, thereby preparing a density measurement specimen.

A calibration curve of a density value according to a height was created based on a standard specimen whose density was known in a linear density gradient tube using a vertical column, the prepared density measurement specimen floated in the column, a height at which the specimen stopped was recorded, the height was compared with the calibration curve, and then a density of the specimen was recorded.

2. Molecular Weights (Mw and Mn) [g/mol]: A weight average molecular weight (Mw) and a number average molecular weight (Mn) were measured using GPC (HLC-8200). TSK-GEL G4000HXL was used as a GPC column, and a column temperature was set to 40° C. Tetrahydrofuran was used as a solvent, polystyrene was used as a standard, and analysis was performed at room temperature and a flow rate of 1 mL/min. In addition, a polydispersity index (PDI) value was calculated using Mw and Mn. Other specific conditions are as follows.

Analytical instrument: A GPC system (model name: 1260 Infinity II High-Temperature GPC System, manufactured by Agilent Technologies) in which three columns (model name: PLgel Olexis 7.5×300 mm, 13 µm, manufactured by Agilent Technologies) and one guard column (model name: PLgel Olexis 7.5×50 mm, 13 µm, manufactured by Agilent Technologies) were connected, for which a temperature was set to 160° C. and a GPC flow rate was set to 1 ml/min, and to which a refractive index detector was connected was used.

Specimen preparation: 2 to 5 mg of a sample was dissolved using 1 ml 1,2,4-trichlorobenzene in 200 ppm of BHT. At this time, the specimen was prepared by stirring at 150° C. for 4 hours using a preprocessor (Agilent PL-SP 260 VS Sample Preparation System), 200 µl of the prepared solution was injected into the GPC, and then the analysis was performed.

3. Melt Flow Index (MFI) [g/10 min]: A melt flow index (MFI) was measured according to ASTM D1238, and a high load melt index (HLMI) was measured in grams eluted per 10 minutes (g/10 min) under conditions of 190° C. and 21.6 kg.

4. Yield Strength, Tensile Strength, and Elongation (At Break) [kg/cm², %]: A yield strength, a tensile strength, and an elongation (at break) were measured according to ASTM D638, and specifically, a thickness of the specimen was 2.0 inch, the specimen was conditioned at a temperature of 30° C. and a humidity of 50% for 40 hours, and then the specimen was measured at a rate of 50 mm/min.

5. Izod Impact Strength (IZ) [kgf·cm/cm]: A specimen was prepared according to ASTM D256 under Dimension A condition (10.16±0.05 mm), the specimen was conditioned at a temperature of 23° C. and a humidity of 50% for 40 hours, and then each of a room-temperature Izod impact strength ($IZ_{25}$) at a temperature of 25±1° C. and a low-temperature Izod impact strength ($IZ_{-20}$) at a temperature of −20±1° C. was measured.

6. Flexural Modulus [kg/cm²]: A specimen was conditioned at a temperature of 23° C. and a humidity of 50% for 40 hours, and then a flexural modulus was measured according to Procedure B condition (0.1 mm/mm/min) of ASTM D790.

7. Environmental Stress Cracking Resistance (ESCR) [time]: An environmental stress cracking resistance was measured according to Condition B, F50 (Bath temperature of 50° C.) of ASTM D1693.

Preparation Example 1

Scrap generated in a secondary battery separator manufacturing process using high-density polyethylene as a raw material or a separator distal end sample recycled after being trimmed was pulverized into a size of 1 cm×1 cm or less to obtain pellets through an extruder at a processing temperature of 230° C., and the pellets were sufficiently dried, thereby obtaining first high-density polyethylene pellets. The physical properties were measured. The results are shown in Table 1.

Examples 1 to 6 and Comparative Examples 1 and 2

The polymer composition prepared according to Table 2 was injected into a twin-screw extruder and melt-extrusion was performed at a processing temperature of 230° C. for a sufficient time to obtain recycled resin pellets, and the recycled resin pellets were sufficiently dried and then melt-mixed with a virgin plastic resin at a processing temperature of 220° C. to prepare pellets for molding through an extruder. The pellets for molding were injected or extruded to prepare a specimen suitable for each physical property evaluation standard, and the physical properties of the specimen were measured. The results are shown in Table 3.

TABLE 1

|  | Preparation Example 1 | A | B | C | D | E | F |
|---|---|---|---|---|---|---|---|
| HLMI | 1 | 14.8 | 9.8 | 7.9 | 3.8 | 35 | 8.5 |
| $MFI_2 - MFI_1$ | — | 13.8 | 8.8 | 6.9 | 2.8 | 34 | — |
| Density | 0.952 | 0.959 | 0.953 | 0.956 | 0.952 | 0.962 | 0.953 |
| Yield strength | 288 | 292 | 260 | 270 | 280 | 290 | 270 |
| Tensile strength | 402 | 267 | 220 | 195 | 277 | 170 | 260 |
| Elongation | 787 | 830 | 970 | 970 | 741 | 1000 | 1120 |
| $IZ_{25}$ | N/B | 11 | 20 | 18 | 45 | 14 | 28 |
| $IZ_{-20}$ | 102 | 8 | 9 | 8 | 32 | — | 18 |
| Flexural modulus | 6801 | 9192 | 9180 | 10180 | 5921 | 11440 | 11340 |
| ESCR | 70 | 315 | >1000 | >1000 | 890 | 40 | >1000 |

A (YUZEX 2600Y, SK chemicals)
B (YUZEX 6100, SK chemicals)
C (YUZEX 8800U, SK chemicals)
D (TR-570, DL Chemical)
E (YUZEX 2500, SK chemicals)
F (SABICHDPE B5308, SABIC)

TABLE 2

| (wt %) | Preparation Example 1 | A | B | C | D | E |
|---|---|---|---|---|---|---|
| Example 1 | 20 | 80 | | | | |
| Example 2 | 30 | 70 | | | | |
| Example 3 | 50 | 50 | | | | |
| Example 4 | 30 | | 70 | | | |
| Example 5 | 40 | | 60 | | | |
| Example 6 | 30 | | | 70 | | |
| Comparative Example 1 | 30 | | | | 70 | |
| Comparative Example 2 | 30 | | | | | 70 |

TABLE 3

|  | Example 1 | Example 2 | Example 3 | Example 4 | Example 5 | Example 6 | Comparative Example 1 | Comparative Example 2 |
|---|---|---|---|---|---|---|---|---|
| HLMI | 7.2 | 5.5 | 3.2 | 4.5 | 3.5 | 2.9 | 1.9 | 32 |
| Density | 0.956 | 0.956 | 0.955 | 0.951 | 0.951 | 0.953 | 0.951 | 0.958 |
| Yield strength | 297 | 290 | 296 | 240 | 250 | 270 | 290 | 295 |
| Tensile strength | 337 | 368 | 352 | 260 | 270 | 230 | 290 | 200 |
| Elongation ($E_3$) | 876 | 871 | 822 | 1150 | 1170 | 920 | 780 | 980 |
| $(x*E_1 + y*E_2)$ | 821.4 | 817.1 | 808.5 | 915.1 | 896.8 | 915.1 | 754.8 | 936.1 |
| $IZ_{25}$ | 23 | 30 | 54 | 40 | 43 | 23 | 48 | 20 |
| $IZ_{-20}$ | 19 | 27 | 43 | 24 | 28 | 22 | 34 | 15 |
| $IZ_{25}/IZ_{-20}$ | 1.2 | 1.1 | 1.3 | 1.7 | 1.5 | 1.2 | 1.4 | 1.3 |
| Flexural modulus ($FM_3$) | 9314 | 8587 | 8486 | 10625 | 10280 | 10022 | 6200 | 10800 |
| $(x*FM_1 + y*FM_2)$ | 8713.8 | 8474.7 | 7996.5 | 8466.3 | 8228.4 | 9166.3 | 6185 | 10048.3 |
| ESCR | 192 | 120 | 82 | >1000 | >1000 | >1000 | 500 | 28 |

It was confirmed from Tables 2 and 3 that since the first high-density polyethylene and the second high-density polyethylene were contained in the polymer composition according to each of Examples, a melt flow index preferred for manufacturing a large container was exhibited, and thus excellent processability was implemented, such that the manufactured molded article had an excellent low-temperature impact strength and an excellent flexural modulus and also had a significantly improved environmental stress cracking resistance compared to the first high-density polyethylene recycled from the secondary battery separator of Preparation Example 1.

In particular, it was confirmed that in the cases of the polymer compositions for manufacturing a large container according to Examples 4 and 5, despite comprising 30 wt % or more of the first high-density polyethylene recycled from the secondary battery separator, mechanical properties suitable for manufacturing a large container such as a melt flow index, an excellent Izod impact strength, an elongation, and a flexural modulus were exhibited, and eco-friendliness was more effectively implemented because 30 wt % or more of the recycled high-density polyethylene was contained.

In addition, from the fact that the physical properties of the product F used for manufacturing an actual large container, for example, a structure for a buoyant body, were equally similar to the physical properties of the polymer composition according to an exemplary embodiment, it was confirmed that in the case of the polymer composition according to an exemplary embodiment, a large container having excellent physical properties was manufactured by recycling the high-density polyethylene recycled from the waste secondary battery separator.

As set forth above, the present disclosure may provide a polymer composition for manufacturing a large container that comprises high-density polyethylene recycled from a secondary battery separator and has excellent mechanical properties. Specifically, a polymer composition having excellent processability may be prepared by recycling a waste secondary battery separator, and an eco-friendly large container having excellent mechanical properties such as a flexural modulus, an elongation, and an impact strength in a wide temperature range, and having an excellent environmental stress cracking resistance may be manufactured by molding the polymer composition.

Hereinabove, although the present disclosure has been described by specific matters and limited exemplary embodiments, they have been provided only for assisting in the entire understanding of the present disclosure. Therefore, the present disclosure is not limited to the exemplary embodiments. Various modifications and changes may be made by those skilled in the art to which the present disclosure pertains from this description.

Therefore, the spirit of the present disclosure should not be limited to the described exemplary embodiments, but the claims and all modifications equal or equivalent to the claims are intended to fall within the spirit of the present disclosure.

The invention claimed is:

1. A polymer composition for manufacturing a large container comprising:
    20 to 50 wt. % of a first high-density polyethylene recycled from a secondary battery separator; and
    50 to 80 wt. % of a second high-density polyethylene having a density of 0.930 to 0.970 g/cm³ and a melt flow index of 5 to 30 g/10 min when measured according to ASTM D1238 (190° ° C., 21.6 kg),
    wherein the first high-density polyethylene recycled from the secondary battery separator has a melt flow index of 0.1 to 5.0 g/10 min,
    wherein a density of the first high-density polyethylene recycled from the secondary battery separator is 0.920 to 0.990 g/cm³,
    wherein the first high-density polyethylene recycled from the secondary battery separator has an elongation of 700% to 1,100% and a flexural modulus of 5,000 to 10,000 kg/cm²,
    wherein the second high-density polyethylene has an elongation of 800% to 1,500% and a flexural modulus of 9,000 to 15,000 kg/cm²,
    wherein the following Expression 4 is satisfied:

$$E_3 > 1.1*(x*E_1 + y*E_2)/100, \qquad \text{[Expression 4]}$$

wherein in Expression 4, x is the wt. % of the first high-density polyethylene recycled from the secondary battery separator, y is the wt. % of the second high-density polyethylene, $E_1$ is the elongation of the first high-density polyethylene recycled from the secondary battery separator, $E_2$ is the elongation of the second high-density polyethylene, and $E_3$ is an elongation of the polymer composition, and wherein the following Expression 6 is satisfied:

$$FM_3 > 1.1*(x*FM_1 + y*FM_2)/100 \qquad \text{[Expression 6]}$$

wherein in Expression 6, x is the wt. % of the first high-density polyethylene recycled from the secondary battery separator, y is the wt. % of the second high-density polyethylene, $FM_1$ is the flexural modulus of the first high-density polyethylene recycled from the secondary battery separator, $FM_2$ is the flexural modulus of the second high-density polyethylene, and $FM_3$ is a flexural modulus of the polymer composition.

2. The polymer composition of claim 1, wherein the secondary battery separator is one or two or more waste separators selected from the group consisting of a waste separator obtained by removing an inorganic coating layer from a separator recycled from a waste lithium secondary battery or a defective secondary battery, scrap generated in a secondary battery separator manufacturing process, and a separator distal end recycled after being trimmed.

3. The polymer composition of claim 2, wherein the first high-density polyethylene recycled from the secondary battery separator has a melt flow index of 0.1 to 3.0 g/10 min when measured according to ASTM D1238 (190° C., 21.6 kg).

4. The polymer composition of claim 2, wherein the first high-density polyethylene recycled from the secondary battery separator has a yield strength of 200 to 400 kg/cm² and a tensile strength of 300 to 500 kg/cm².

5. The polymer composition of claim 2, wherein the polymer composition comprises 30 to 50 wt % of the first high-density polyethylene recycled from the secondary battery separator and 50 to 70 wt % of the second high-density polyethylene.

6. The polymer composition of claim 3, wherein the melt flow index $MFI_1$ of the first high-density polyethylene and the melt flow index $MFI_2$ of the second high-density polyethylene satisfy the following Expression 2, and the melt flow index is measured according to ASTM D1238 (190° C., 21.6 kg), $7 \leq MFI_2 - MFI_1 \leq 13.$ [Expression 2]

7. The polymer composition of claim 1, wherein the second high-density polyethylene has a melt flow index of 5 to 15 g/10 min when measured according to ASTM D1238 (190° C., 21.6 kg).

8. The polymer composition of claim 7, wherein the second high-density polyethylene has a room-temperature Izod impact strength of 50 kgf·cm/cm or less when measured at 25° C.

9. The polymer composition of claim 1, wherein the polymer composition has a melt flow index of 3 to 9 g/10 min when measured according to ASTM D1238 (190° C., 21.6 kg).

10. The polymer composition of claim 9, wherein the polymer composition has a yield strength of 240 kg/cm² or more and a tensile strength of 250 kg/cm² or more.

11. The polymer composition of claim 10, wherein the polymer composition satisfies the following conditions (1) and (2):

$1 < IZ_{25}/IZ_{-20} < 3$ (1)

$ESCR > 800$ hours (2)

in the conditions (1) and (2), $IZ_a$ is an Izod impact strength (kgf·cm/cm) measured at a temperature of a ±1° C., a is a real number, and ESCR is an environmental stress cracking resistance (time) measured according to ASTM D1693.

12. The polymer composition of claim 5, wherein the polymer composition has $IZ_{25}$ and $IZ_{-20}$ independently of each other of 20 kgf·cm/cm or more and a flexural modulus of 10,000 kg/cm² or more, where $IZ_a$ is an Izod impact strength (kgf·cm/cm) measured at a temperature of a ±1°C, and a is a real number.

13. The polymer composition of claim 1, wherein the first high-density polyethylene comprises a weight average molecular weight (Mw) of 100,000 g/mol to 1,000,000 g/mol.

* * * * *

UNITED STATES PATENT AND TRADEMARK OFFICE
CERTIFICATE OF CORRECTION

PATENT NO. : 12,060,477 B2
APPLICATION NO. : 18/158708
DATED : August 13, 2024
INVENTOR(S) : Hye Jin Lee et al.

It is certified that error appears in the above-identified patent and that said Letters Patent is hereby corrected as shown below:

In the Claims

Column 18, Line 40, Claim 1, delete "(190° ° C.," and insert -- (190° C., --

Column 20, Line 24, Claim 11, delete "+1° C.," and insert -- ±1° C., --

Column 20, Line 31, Claim 12, delete "±1°C," and insert -- ±1° C., --

Signed and Sealed this
Fifth Day of November, 2024

Katherine Kelly Vidal
*Director of the United States Patent and Trademark Office*